L. H. PERLMAN.
WHEEL.
APPLICATION FILED AUG. 16, 1917.
1,342,225.
Patented June 1, 1920.
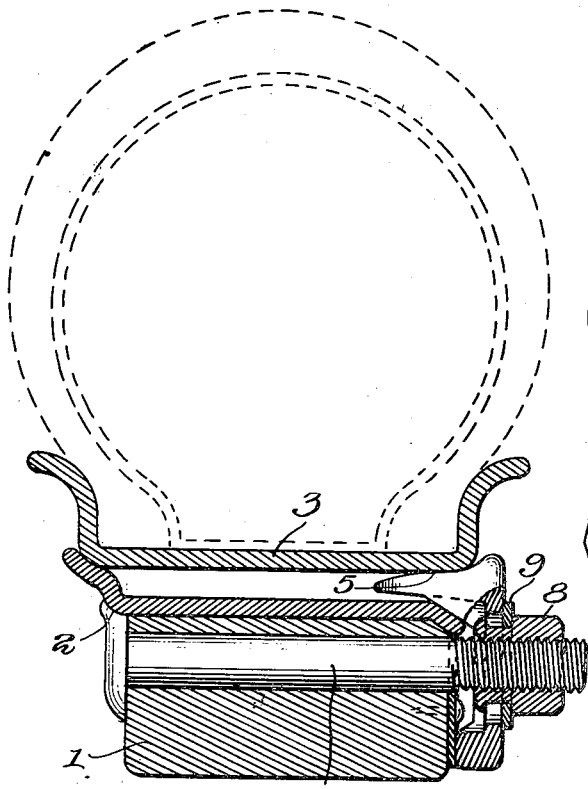
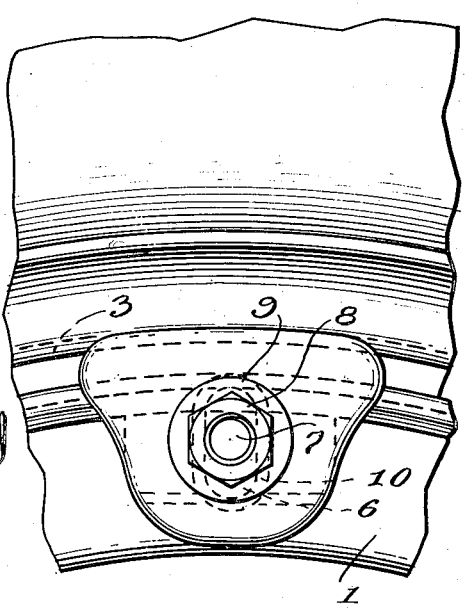
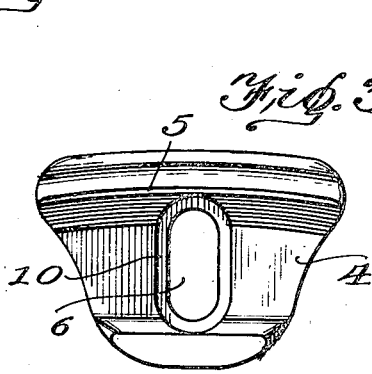
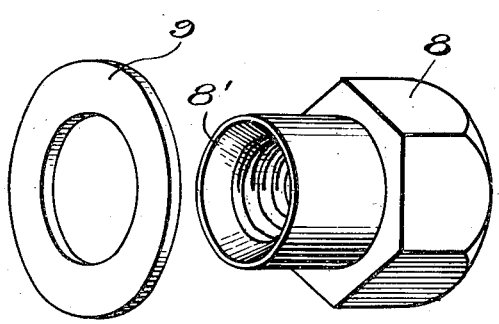
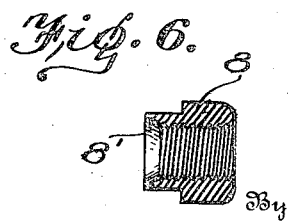
Witnesses
H. H. Lybrand
C. H. Fesler
Inventor
Louis H. Perlman,
By Edgar M. Kitchin
Attorney.

UNITED STATES PATENT OFFICE.

LOUIS H. PERLMAN, OF NEW YORK, N. Y.

WHEEL.

1,342,225.   Specification of Letters Patent.   Patented June 1, 1920.

Application filed August 16, 1917. Serial No. 186,528.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in supports for demountable rims of wheels, such as the carrying wheels of an automobile, and is more particularly directed to the construction of side wedge plates.

The primary object in view is the provision of means for swiveling a nut to a wedge plate in a simple, inexpensive and effective manner.

With this and further objects in view as will in part hereinafter become apparent and in part be stated, the invention comprises certain novel constructions, combinations and arrangements of parts as subsequently specified and claimed.

In the accompanying drawing,—

Figure 1 is a transverse section through the peripheral portion of a wheel embodying the features of the present invention, parts being seen in elevation.

Fig. 2 is a side elevation of the parts seen in Fig. 1.

Figs. 3, 4 and 5 are detail detached views of parts of the wedge plate and its nut prior to assemblage.

Fig. 6 is a vertical section taken through the nut blank as seen in Fig. 5.

Referring to the drawing by numerals, 1 indicates the felly of an ordinary wheel on which is fixed the felly band or fixed rim 2 of the usual type designed to sustain the demountable rim 3 of any appropriate form. The rim 3 is sustained at its inner edge by the usual supporting stop flange of the band 2, and at its outer edge by spaced wedge plates, each consisting of a plate 4 having an axially inwardly extending wedging projection 5 designed to extend between the rim 3 and band 2 for maintaining the rim tensioned in position. The plate 4 is formed with a slot 6 for the accommodation of the retaining bolt 7 and for permitting the plate to move radially as the wedging projection 5 advances inward. The inward thrust of the wedge is accomplished by the employment of a nut 8 threaded on the bolt 7 and arranged to exert its pressure on the wedge plate. To facilitate withdrawal of the wedge plate, it has been found desirable to swivel nuts corresponding to nut 8 to their respective wedge plate, but difficulties have presented themselves in the matter of practical construction, one of the most important items of which is the expense of production, and the object of the present invention is to enable the swiveling of the nut in a thoroughly efficient and practical manner at a material reduction in expense over those swiveled connections with which I am familiar.

In Fig. 5, I have shown on an enlarged scale a nut blank prepared to be inserted through the slot in a wedge plate, the wedge plate being seen on a smaller scale in Fig. 3. As seen in Fig. 5, and also in Fig. 6, the nut blank is internally threaded, but the threads terminate an appropriate distance short of the free end of the projecting sleeve formed integral with the nut, leaving a smooth portion 8'. The smooth portion 8' is formed with an outward flare so that the material of the sleeve of the nut at the portion 8' decreases in thickness until it presents a relatively thin edge. A washer 9 is placed on the sleeve and against the shoulder of the polysided portion of the nut, and then the sleeve is introduced through the slot 6. The smooth portion 8' is then spun or stamped out radially to the position seen in Fig. 1, so as to form an annular outstanding flange of greater diameter than the width of the slot 6. By preference a rabbet 10 is formed about the edge of the slot 6 into which the flange of the nut extends. The nut is thus effectively swiveled to the wedge plate and the operation of the parts will be readily understood by those familiar with the art.

What is claimed is:—

The combination with a wedge plate having an aperture, of a nut formed with a sleeve extending through the aperture, a portion of the sleeve being unthreaded and having a flaring bore, so that the material of the sleeve at the smooth portion decreases in thickness toward the end of the sleeve and terminates in a relatively thin edge, and an integral annulus surrounding the sleeve, parts of the sleeve at the flared portion thereof being turned outward to a radially outstanding condition to form an annular shoulder of greater diameter than the width of the aperture in the wedge plate.

In testimony whereof I affix my signature in presence of two witnesses.

LOUIS H. PERLMAN.

Witnesses:
I. B. LEIBSON,
E. M. FRICKLING.